US 6,709,488 B2

(12) United States Patent
Lunden et al.

(10) Patent No.: US 6,709,488 B2
(45) Date of Patent: Mar. 23, 2004

(54) ASSEMBLY AND METHOD FOR SEPARATING GAS FROM FLOWING LIQUIDS

(75) Inventors: Leo Lunden, Karhula (FI); Jouni Mussalo, Kotka (FI)

(73) Assignee: Ecopump Oy, Kotka (FI)

( * ) Notice: Subject to any disclaimer, the term of this patent is extended or adjusted under 35 U.S.C. 154(b) by 11 days.

(21) Appl. No.: 10/067,759

(22) Filed: Feb. 8, 2002

(65) Prior Publication Data

US 2002/0117053 A1 Aug. 29, 2002

(30) Foreign Application Priority Data

Feb. 8, 2001 (FI) ............................... 20010234

(51) Int. Cl.[7] .............................. B01D 19/00
(52) U.S. Cl. ................. 95/262; 96/206; 96/220
(58) Field of Search ............... 95/241, 262, 259, 95/260; 96/155, 184, 220, 204, 206; 210/188

(56) References Cited

U.S. PATENT DOCUMENTS

| 1,095,463 A | * | 5/1914 | Kieser |
| 1,255,395 A | * | 2/1918 | Duram |
| 2,336,430 A | * | 12/1943 | Wery |
| 2,785,766 A | * | 3/1957 | Murdock, Sr. |
| 5,039,425 A | * | 8/1991 | Caris et al. |
| 5,674,199 A | * | 10/1997 | Brugger |
| 5,931,990 A | * | 8/1999 | Andrews |
| 6,053,967 A | | 4/2000 | Heilmann et al. |
| 2002/0117053 A1 | * | 8/2002 | Lunden et al. |

FOREIGN PATENT DOCUMENTS

| DE | A 29 00 075 | 7/1980 |
| EP | 0 728 509 | 8/1996 |
| GB | 810753 | 3/1959 |

* cited by examiner

*Primary Examiner*—Duane S. Smith
(74) *Attorney, Agent, or Firm*—Birch, Stewart, Kolasch & Birch, LLP

(57) ABSTRACT

The invention relates to an assembly and a method for separating gas from gas-containing liquids handled in a process industry. For separating the entrained gas, particularly air, or partial removal thereof, from a liquid flow, the apparatus includes a liquid-flow guide adapted substantially close to the lower end of an inlet pipe discharging the gas-containing liquid into a container.

17 Claims, 3 Drawing Sheets

ASSEMBLY AND METHOD FOR SEPARATING GAS FROM FLOWING LIQUIDS

BACKGROUND OF THE INVENTION

1. Field of the Invention

The present invention relates to an assembly for separating gas from flowing liquids handled in a process industry.

2. Description of Background Art

Gases such as air entrained in liquids handled in a process industry are often problematic. The complications occur most frequently in the pumping or measurement of liquids. Gas, particularly air, carried abundantly along with liquids complicates measurements imposed on liquids whereby typically the sensing results become inaccurate and unreliable. Moreover, since air also causes other process complications such as microbial growth, it is most advantageous to separate entrained air.

Conventionally, gas separation from flows of minor volumetric rate has been carried out by passing the end of a pipe under the surface of water. The purpose of keeping the pipe end submerged under water is to form a water trap to the outlet of the pipe. However, a problem arises at high flow rates therefrom that water can transport the air as bubbles along with its flow, whereby gravity buoyancy of the bubbles does not impart them a sufficient large upward velocity to move them against the flow fast enough to overcome the downward velocity of the water flow.

SUMMARY AND OBJECTS OF THE INVENTION

The present invention is directed to provide an arrangement capable of eliminating the above-described problems. It is a particular object of the invention is provide both an apparatus and a method for separating gas from a liquid The characterizing features of the invention are disclosed in the appended claims specifying a novel arrangement for separating gases from a liquid handled in a process industry.

More specifically, the assembly for separation of gas-ontaining liquids, particularly for separating air therefrom, is characterized by having a liquid-flow, guide adapted to the lower end of the inlet pipe discharging gas-containing liquid into a container.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
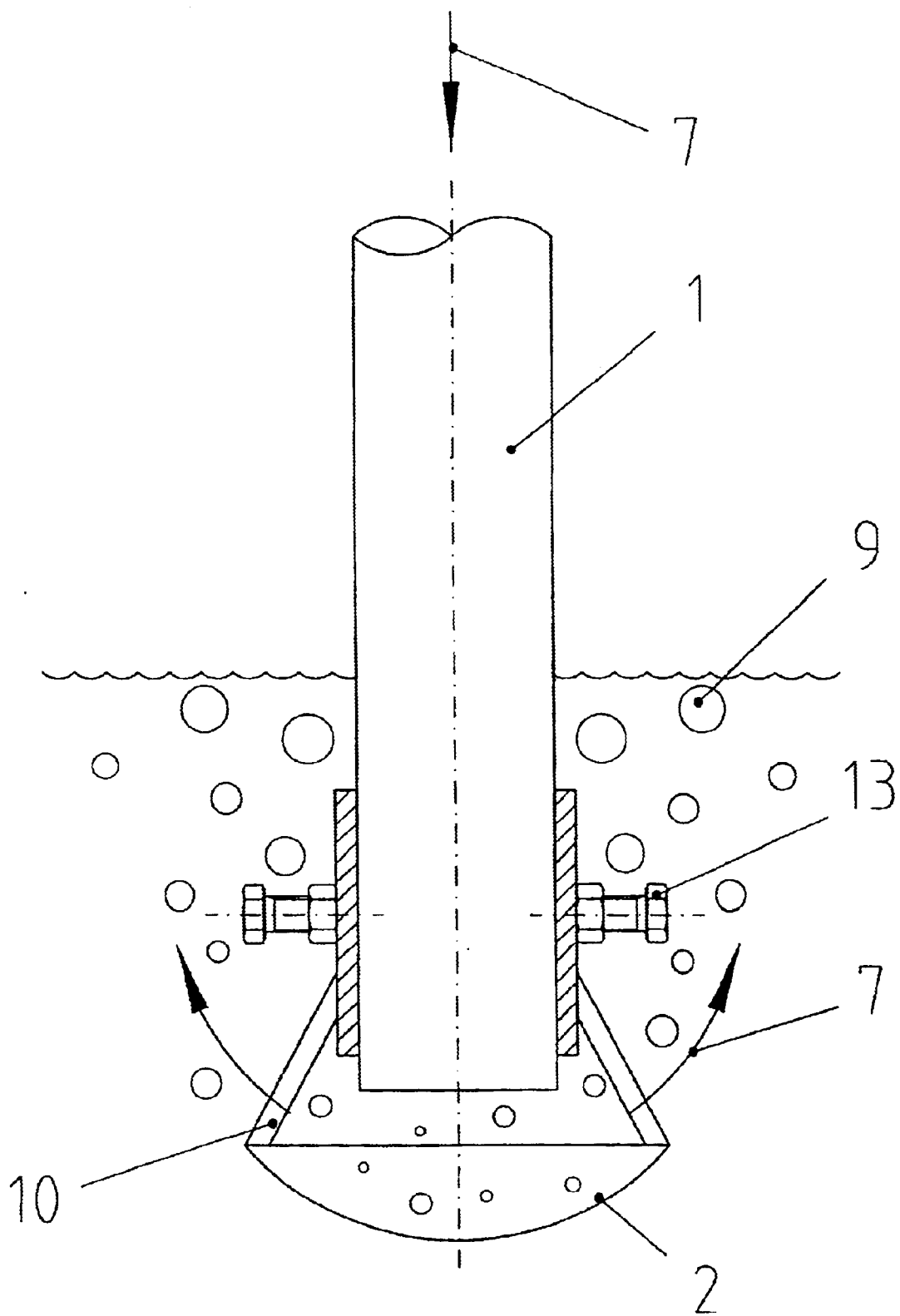
FIG. 1 a flow guide according to the invention for separating gas from the flow of gas-containing liquids handled in a process industry.

Now referring to FIG. 1, a guide 2 of a liquid flow 7 is mounted essentially to G the lower end of an inlet pipe 1 discharging gas-containing liquid into a container. The height position of the flow guide 2 in the vertical direction is adjustable with the help of fixture means 13 for optimizing the separation efficiency. Depending on the type of the liquid being handled in the process, the shape of flow guide 2 can be made essentially flat, upward concave or downward convex. Advantageously, the bottom of the flow guide 2 is made concave so that its edges are curved upward toward the liquid level surface. More precisely, the flow guide 2 is made from sheet metal, perforated plate or a sheet material having a desired contour such as undulated plate. As shown in FIG. 1, the flow guide 2 is advantageously mounted on support rods 10 or the like elements that displace the flow guide substantially at a distance from the lower end of the inlet pipe 1. The shape and material of the flow guide can be varied as required. The optimum dimensions of the flow guide are determined by several design factors such as the kind of fluid flowing in the process, the viscosity, temperature, gas/air concentration 9 thereof and the velocity of the liquid flow 7. The final design can be best optimized with the help of laboratory tests.

Figure 2:
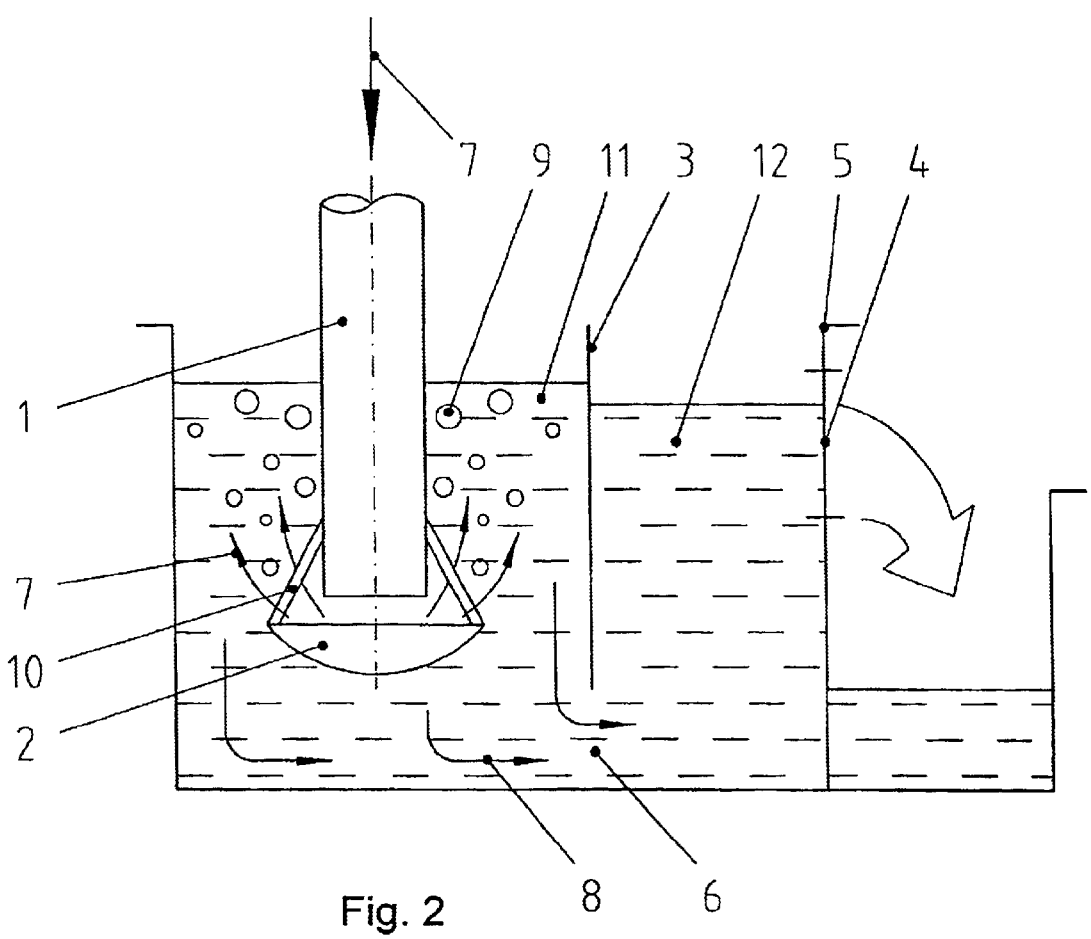
FIG. 2 shows an embodiment of a liquid flow measurement arrangement I according to the invention.

In FIG. 2 is shown a preferred exemplary embodiment adapted for flow measurements, whereby the function of the flow guide 2 is to deflect the liquid flow 7 so as to direct the flow toward the liquid level surface. The flow guide 2 makes it easier to direct the liquid flow 7 formed by water with entrained air upward toward the liquid level surface thus facilitating the separation of air 9 from water 7 in order to further provide a solid flow 8 (liquid with the entrained air 9 separated out). Herein it must be understood that in a conventional arrangement the liquid flow 7 takes place in a consistently downward direction which makes the separation of air bubbles 9 very difficult. Further aiding the function of flow guide 2 in the embodiment according to the invention, the design of a container 11 serving as a liquid receiving vessel is advantageously made such that the flow velocity becomes sufficiently slow to augment the separation of air bubbles 9. Additional stabilization of the solid flow 8 is gained from the use of a partition 3 and a narrow channel 6 at the bottom of the container 11 into flow-receiving chamber 12 of the container 11. After entering the chamber 12, the solid flow 8 passes through a weir 4 formed in an outer wall 5 of the container 11.

Figure 3:
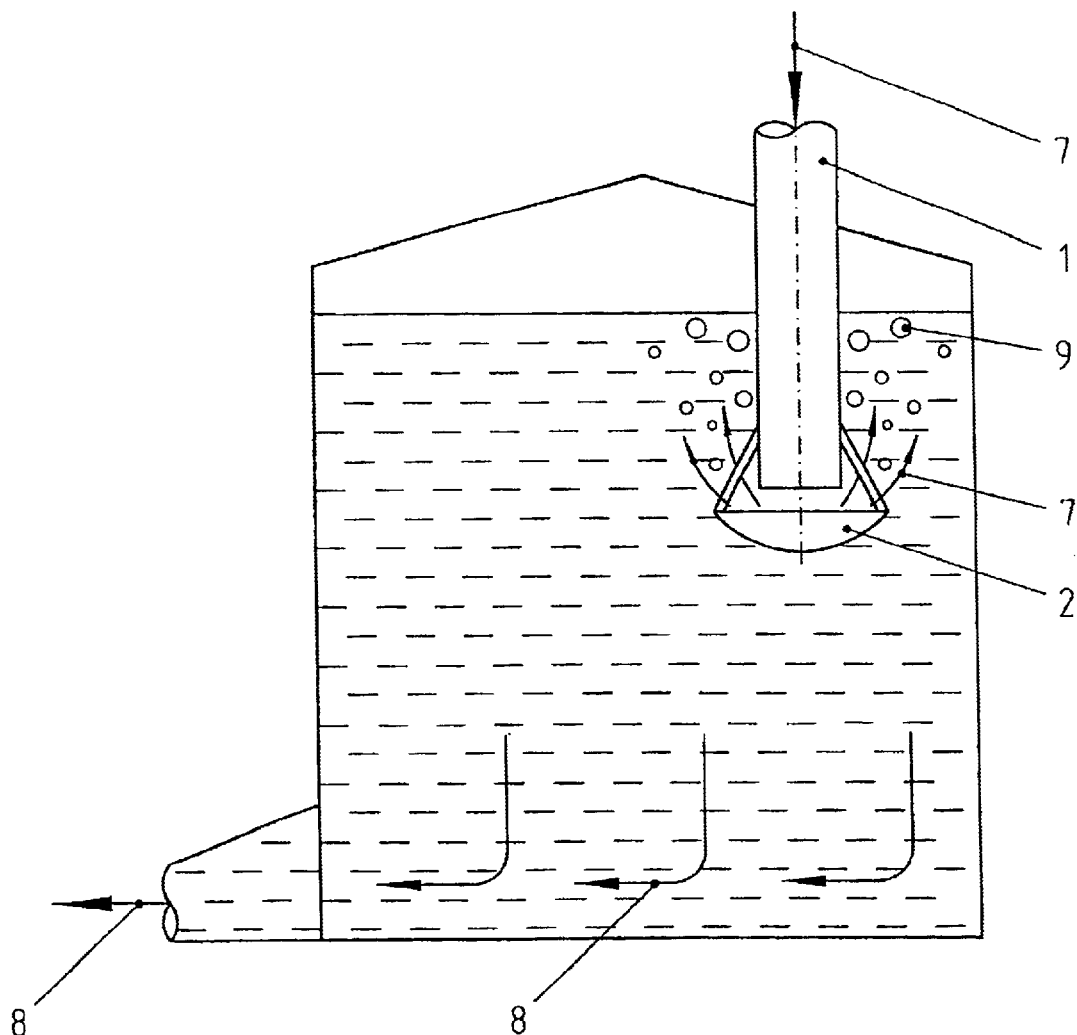
FIG. 3 shows an embodiment of a liquid flow receiver container according to the invention.

In FIG. 3 is shown an exemplary embodiment wherein the flow guide 2 is adapted to a gas-separating container. In this example, the flow guide 2 is mounted essentially in the fashion as in FIG. 1 to the lower end of an inlet pipe 1 discharging gas-ontaining liquid into a container. On the above described grounds, this embodiment according to the invention can be used in a great number of applications dealing with a liquid flow 7 carrying entrained gas, most typically air 9, that is desired to be efficiently separated or at least reduced down to a suitable level. In a process industry, such problems are encountered probably most frequently in the pumping of liquids and measurements performed thereon. The inventive spirit of the present arrangement is based on guiding air 9 and other entrapped gas bubbles toward the surface level of a liquid container thus augmenting and speeding up the removal of entrained gas. The arrangement according to the invention can be used in almost any type of inlet pipe 1 of measurement vessels and containers wherein the removal of air 9 and other gases is desired to be augmented.

To a person skilled in the art it is obvious that the invention is not limited by the above-described exemplary embodiments, but rather may be varied within the inventive spirit and scope of the appended claims.

What is claimed is:

1. An assembly for separation of gas-containing liquids handled in a process industry, wherein for the separation or partial removal of liquid entrained gas from a liquid flow, the assembly comprising:

a liquid-flow guide suspended from an inlet pipe discharging the gas-containing liquid into a container, the liquid-flow guide being disposed substantially close to a lower end of the inlet pipe.

2. The assembly of claim 1, wherein a height position of the flow guide is made adjustable in order to optimize measurement of the gas-containing liquids in pulp, board and paper industries, and to enhance the separation of the gas therein.

3. The assembly of claim 1, wherein the separation of the gas performed by the flow guide in the assembly is augmented with help of a partition having a bottom flow channel provided therewith so as to pass the liquid from a receiving chamber further to another chamber.

4. The assembly of claim 1, wherein a weir is provided on an outer wall of the chamber.

5. The assembly of claim 1, wherein the flow guide is shaped so as to guide the gas-containing liquid flow substantially upward toward a surface of the liquid.

6. The assembly of claim 1, wherein the bottom of the flow guide has a concave shape with its edges curving upward toward a surface of the liquid or, alternatively, as required by properties of the liquid being handled, is shaped either as a flat plane or with a downward convex shape.

7. The assembly of claim 1, wherein the flow guide is made from sheet metal, perforated plate or other sheet material having a contour of an undulated plate, and wherein the flow guide is mounted on support rods that displace the flow guide substantially at a distance from the lower end of the inlet pipe.

8. A method for separating gas from gas-containing liquids handled in a process industry, the method comprising the step of:

impinging the gas-containing liquid on a liquid-flow guide suspended from a lower end of an inlet pipe discharging the gas-containing liquid into a container, thus separating the gas from a liquid flow.

9. The method of claim 8, further comprising the step of:

adjusting a height position of the flow guide in order to optimize measurement of gas-containing liquids in pulp, board and paper industries, and to enhance the separation of the gas.

10. The method of claim 8, further comprising the step of:

using the flow guide to guide the gas-containing liquid flow substantially toward a surface of the liquid in order to enhance the separation of the gas from the liquid flow, thereby obtaining a solid flow.

11. The method of claim 8 further comprising the step of:

setting dimensions of a flow-receiving chamber for sufficiently slowing a liquid flow velocity, thereby permitting the separation of the gas from the liquid flow.

12. The method of claims 8–9, further comprising the step of:

passing the solid flow having the entrained gas separated therefrom is via a bottom flow channel to another chamber.

13. The method of claims 8–10, further comprising the step of:

passing the separated solid flow via a weir formed in an outer wall of another chamber.

14. The assembly of claim 1, wherein a height position of the flow guide is made adjustable in order to optimize measurement of the gas-containing liquids, and to enhance the separation of the gas therein.

15. The assembly of claim 1, wherein the gas is air.

16. The method of claim 8, further comprising the step of:

adjusting a height position of the flow guide in order to optimize measurement of the gas-containing liquids, and to enhance the separation of the gas therein.

17. The method of claim 8, wherein the gas is air.

\* \* \* \* \*